(12) United States Patent
Huang et al.

(10) Patent No.: US 10,159,001 B2
(45) Date of Patent: Dec. 18, 2018

(54) METHOD, DEVICE AND SYSTEM FOR DETECTING NETWORK COVERAGE CONDITION

(71) Applicant: ZTE Corporation, Shenzhen, Guangdong (CN)

(72) Inventors: Ying Huang, Shenzhen (CN); Lin Chen, Shenzhen (CN); Yuqin Chen, Shenzhen (CN); Dapeng Li, Shenzhen (CN)

(73) Assignee: XI'AN ZHONGXING NEW SOFTWARE CO.LTD., Xi'an (CN)

( * ) Notice: Subject to any disclaimer, the term of this patent is extended or adjusted under 35 U.S.C. 154(b) by 119 days.

(21) Appl. No.: 15/127,585

(22) PCT Filed: Jul. 14, 2014

(86) PCT No.: PCT/CN2014/082165
§ 371 (c)(1),
(2) Date: Sep. 20, 2016

(87) PCT Pub. No.: WO2015/139388
PCT Pub. Date: Sep. 24, 2015

(65) Prior Publication Data
US 2018/0115911 A1    Apr. 26, 2018

(30) Foreign Application Priority Data
Mar. 20, 2014    (CN) .......................... 2014 1 0105728

(51) Int. Cl.
*H04W 16/24* (2009.01)
*H04W 24/10* (2009.01)
(Continued)

(52) U.S. Cl.
CPC .......... *H04W 16/24* (2013.01); *H04B 17/318* (2015.01); *H04W 24/10* (2013.01);
(Continued)

(58) Field of Classification Search
CPC ..... H04W 16/24; H04W 24/10; H04W 48/08; H04W 84/042; H04W 92/18; H04B 17/336; H04B 17/318
See application file for complete search history.

(56) References Cited

U.S. PATENT DOCUMENTS 8,107,883 B2    1/2012  Peng
2007/0025287 A1*  2/2007  Goren .................. H04W 16/18
                                                370/328
(Continued)

FOREIGN PATENT DOCUMENTS

CN    101489214 A    7/2009
CN    101998418 A    3/2011
(Continued)

OTHER PUBLICATIONS

International Search Report in international application No. PCT/CN2014/082165, dated Dec. 22, 2014, 6 pgs.
(Continued)

*Primary Examiner* — Brian D Nguyen
(74) *Attorney, Agent, or Firm* — Cooper Legal Group, LLC

(57) ABSTRACT

Provided are a method, device and system for detecting a network coverage condition. The method comprises: receiving, by a device-to-device (D2D) user equipment (UE), network coverage judgement parameter information sent by a base station (101); and detecting, by the D2D UE, a network coverage condition of the location thereof according to the network coverage judgement parameter information (102).

18 Claims, 4 Drawing Sheets

(51) Int. Cl.
  *H04W 48/08* (2009.01)
  *H04B 17/318* (2015.01)
  *H04B 17/336* (2015.01)
  *H04W 84/04* (2009.01)
  *H04W 92/18* (2009.01)

(52) U.S. Cl.
  CPC ........... *H04W 48/08* (2013.01); *H04B 17/336* (2015.01); *H04W 84/042* (2013.01); *H04W 92/18* (2013.01)

(56) References Cited

U.S. PATENT DOCUMENTS

| | | | |
|---|---|---|---|
| 2010/0240312 A1 | 9/2010 | Peng | |
| 2012/0236826 A1* | 9/2012 | Roy | H04W 36/0061 370/331 |
| 2013/0023276 A1* | 1/2013 | Du | H04W 72/1226 455/452.1 |
| 2013/0151659 A1* | 6/2013 | Alberth | H04L 67/2847 709/217 |
| 2013/0273934 A1* | 10/2013 | Meredith | H04W 16/04 455/456.1 |
| 2013/0322413 A1* | 12/2013 | Pelletier | H04W 72/1289 370/336 |
| 2013/0336230 A1* | 12/2013 | Zou | H04W 72/085 370/329 |
| 2014/0056220 A1* | 2/2014 | Poitau | H04W 76/14 370/328 |
| 2014/0112175 A1* | 4/2014 | Pantelidou | H04W 28/26 370/252 |
| 2014/0133333 A1* | 5/2014 | Liu | H04W 24/10 370/252 |
| 2014/0219131 A1* | 8/2014 | Yang | H04W 24/10 370/252 |
| 2014/0287770 A1* | 9/2014 | Liu | H04W 64/006 455/450 |
| 2015/0056982 A1* | 2/2015 | Sorrentino | H04W 60/00 455/426.1 |

FOREIGN PATENT DOCUMENTS

| | | |
|---|---|---|
| CN | 102365897 A | 2/2012 |
| CN | 103024911 A | 4/2013 |
| CN | 103338452 A | 10/2013 |
| WO | 2013181421 A2 | 12/2013 |

OTHER PUBLICATIONS

English Translation of the Written Opinion of the International Search Authority in international application No. PCT/CN2014/082165, dated Dec. 22, 2014, 13 pgs.

* cited by examiner

METHOD, DEVICE AND SYSTEM FOR DETECTING NETWORK COVERAGE CONDITION

TECHNICAL FIELD

The disclosure relates to the field of wireless communication, and in particular to a method, device and system for detecting network coverage condition.

BACKGROUND

A Device-to-Device (D2D) communication technology is a technology configured to determine proximity between two or more pieces of D2D User Equipment (UE) or configured to determine that first UE is proximal to second UE, and is a technology for implementing direct communication of part or all of communication data between D2D UE without a network infrastructure. There are mainly three D2D communication application scenarios: first, two pieces of D2D UE perform data interaction under coverage of a cellular network, and their user plane data does not pass through a network infrastructure; 2, in an area with weak or no cellular network coverage, relay transmission may be implemented through other D2D UE; and 3, direct communication among multiple pieces of D2D UE is allowed under the condition that a cellular network may not work normally.

When D2D UE is located in a coverage area of a cellular network, a D2D communication resource is usually acquired in an Evolved Node B (eNB)-based scheduling manner; while when the D2D UE moves out of the coverage area of the cellular network, a resource is required to be acquired in a contention manner.

However, the problem of how to determine switching from an eNB-based allocation manner to a contention-based resource allocation manner in a process of movement of D2D UE out of network coverage is not solved in a conventional art. Moreover, if D2D UE determines it moves out of network coverage too late, the D2D UE may be disconnected from an eNB or a Radio Link Failure (RLF) may occur before a contention-based resource allocation mechanism is started, that is, a D2D resource allocated by the eNB may not be acquired, and consequently, continuity and quality of service of a D2D service may be influenced. But if the D2D UE determines it moves out of the network coverage too early, the D2D UE within the network coverage is automatically switched to acquire the D2D resource in a contention manner and the D2D resource gets out of control of the eNB.

SUMMARY

In view of this, the disclosure is intended to provide a method, device and system for detecting network coverage condition, which may ensure service continuity and quality of service of D2D communication and ensure control of an eNB over a D2D communication resource of D2D UE.

In order to achieve the purpose, the technical solutions of the disclosure are implemented as follows.

The disclosure provides a method for detecting network coverage condition, which may include that:

D2D UE receives network coverage determination parameter information sent by an eNB; and the D2D UE detects a network coverage condition of the D2D UE's position according to the network coverage determination parameter information.

In the solution, the network coverage determination parameter information may include at least one of:

a Radio Resource Management (RRM) measurement threshold value, the RRM measurement threshold value including Reference Signal Received Power (RSRP) and/or Reference Signal Received Quality (RSRQ);

a Radio Link Monitoring (RLM) measurement threshold value, the RLM measurement threshold value being a Signal to Interference plus Noise Ratio (SINR) value or a Block Error Rate (BLER) value;

an RLM measurement parameter, the RLM measurement parameter including an N310 value and/or a T310 value and/or an N311 value; and indication information, the indication information representing that the network coverage determination parameter information is determination parameter information for out-of-coverage and/or determination parameter information for edge-of-coverage.

In the solution, when the network coverage determination parameter information includes a measurement threshold value, the network coverage determination parameter information may further include: a determination time length, herein the determination time length is a time length within which a measurement value of the D2D UE is required to meet a determination condition indicated by the measurement threshold value.

In the solution, the step that the D2D UE receives the network coverage determination parameter information sent by the eNB may include that:

the D2D UE receives the network coverage determination parameter information sent by the eNB through Radio Resource Control (RRC)-specific signalling or a System Information Block (SIB) message.

In the solution, the step that the D2D UE receives the network coverage determination parameter information sent by the eNB may include that:

the D2D UE sends request information to the eNB, the request information being configured to request the eNB to send the network coverage determination parameter information;

and/or, when determining that the D2D UE is located on an edge of a cell, the eNB actively sends the network coverage determination parameter information to the D2D UE, and correspondingly, the D2D UE receives the network coverage determination parameter information sent by the eNB;

and/or, the eNB sends the network coverage determination parameter information to all D2D UE in the cell.

In the solution, the step that the D2D UE sends the request information to the eNB may include that:

when a D2D service of the D2D UE is triggered, the request information for the network coverage determination parameter information is sent to the eNB; and/or when determining that the D2D UE is located in an edge area of network coverage, the D2D UE sends the request information for the network coverage determination parameter information to the eNB.

In the solution, the step that the D2D UE detects the network coverage condition of the D2D UE's position according to the network coverage determination parameter information may include that:

the D2D UE determines that the D2D UE's current position is in the edge area of the network coverage or an out-of-coverage area according to the network coverage determination parameter information.

In the solution, the step that the D2D UE detects the network coverage condition of the D2D UE's position according to the network coverage determination parameter information may include that:

the D2D UE determines a network coverage condition of the D2D UE's current position according to (a) measured RRM or RLM measurement value(s) of (a) signal(s) of a serving cell and/or a neighbouring cell and the network coverage determination parameter information;

or, when determining that the measured value(s) of the signal(s) of the serving cell and/or the neighbouring cell meet(s) the network coverage determination parameter information, the D2D UE reports the RRM or RLM measurement value(s) of the signal(s) of the serving cell and/or the neighbouring cell to the eNB for the eNB to determine the network coverage condition of the D2D UE according to the RRM or RLM measurement value(s) of the signal(s) of the serving cell and/or the neighbouring cell and send indication information to the D2D UE, and the D2D UE determines the network coverage condition of the D2D UE's current position according to the indication information sent by the eNB.

In the solution, after the step that the D2D UE determines the network coverage condition of the D2D UE's current position according to the RRM or RLM measurement value(s) of the signal(s) of the serving cell and/or the neighbouring cell and the network coverage determination parameter information, the method may further include that:

the D2D UE sends network coverage condition information to the eNB, herein the network coverage condition information may include at least one of: out-of-coverage indication information, edge-of-coverage indication information, and the RRM or RLM measurement value(s), measured by the D2D UE, of the signal(s) of the serving cell and/or the neighbouring cell;

the RRM measurement value may include: an RSRP value and/or an RSRQ value; and the RLM measurement value may include: an SINR value and/or a BLER value.

In the solution, the step that the D2D UE sends the network coverage condition information to the eNB may include that:

the D2D UE sends the network coverage condition information to the eNB according to an indication, issued by the eNB, of reporting the network coverage condition information, herein the eNB issues the indication to the D2D UE through an SIB message, or RRC-specific signalling, or a Media Access Control (MAC) Control Element (CE) or Downlink Control Information (DCI) of a Physical Downlink Control Channel (PDCCH).

In the solution, after the step that the D2D UE detects the network coverage condition of the D2D UE's position according to the network coverage determination parameter information, the method may further include that:

when determining that the D2D UE's position is in the out-of-coverage area, the D2D UE receives or sends D2D information by virtue of a resource pool for out-of-coverage;

and/or, when determining that the D2D UE's position is in the edge area of the network coverage, the D2D UE receives or sends the D2D information by virtue of the resource pool for out-of-coverage.

In the solution, the method may further include that:

if not receiving the network coverage determination parameter information sent by the eNB, the D2D UE determines, after a Radio Link Failure (RLF) is detected through RLM measurement, that the D2D UE's current position is in the out-of-coverage area, and sends and/or receives the D2D information by virtue of a D2D resource.

The disclosure further provides a method for detecting network coverage condition, which may include that:

an eNB sends network coverage determination parameter information to D2D UE located in its serving cell for the D2D UE to detect a network coverage condition of the D2D UE's position according to the network coverage determination parameter information.

In the solution, the network coverage determination parameter information may include at least one of:

an RRM measurement threshold value, the RRM measurement threshold value including RSRP and/or RSRQ;

an RLM measurement threshold value, the RLM measurement threshold value being an SINR value or a BLER value;

an RLM measurement parameter, the RLM measurement parameter including an N310 value and/or a T310 value and/or an N311 value; and indication information, the indication information representing that the network coverage determination parameter information is determination parameter information for out-of-coverage and/or determination parameter information for edge-of-coverage.

In the solution, when the network coverage determination parameter information includes a measurement threshold value, the network coverage determination parameter information may further include: a determination time length, herein the determination time length is a time length within which a measurement value of the D2D UE is required to meet a determination condition indicated by the measurement threshold value.

In the solution, the step that the eNB sends the network coverage determination parameter information to the D2D UE located in its serving cell may include that:

when receiving request information sent by the D2D UE, the eNB sends the network coverage determination parameter information to the D2D UE located in its serving cell, the request information being configured to request the eNB to send the network coverage determination parameter information;

and/or, when determining that the D2D UE is located on an edge of the cell, the eNB actively sends the network coverage determination parameter information to the D2D UE;

and/or, the eNB sends the network coverage determination parameter information to all D2D UE in the cell.

In the solution, the method may further include that:

the eNB determines the network coverage condition of the D2D UE according to (an) RRM or RLM measurement value(s), reported by the D2D UE, of (a) signal(s) of the serving cell and/or a neighbouring cell, and sends indication information to the D2D UE for the D2D UE to determine a network coverage condition of the D2D UE's current position according to the indication information sent by the eNB.

In the solution, the method may further include that:

the eNB issues an indication of reporting network coverage condition information to the D2D UE through an SIB message, RRC-specific signalling, a MAC CE or DCI of a PDCCH.

The disclosure provides D2D UE, which may include:

a receiving unit configured to receive network coverage determination parameter information sent by an eNB; and a determination unit configured to detect a network coverage condition of the D2D UE's position according to the network coverage determination parameter information.

In the solution, the network coverage determination parameter information may include at least one of:

an RRM measurement threshold value, the RRM measurement threshold value including RSRP and/or RSRQ;

an RLM measurement threshold value, the RLM measurement threshold value being an SINR value or a BLER value;

an RLM measurement parameter, the RLM measurement parameter including an N310 value and/or a T310 value and/or an N311 value; and indication information, the indication information representing that the network coverage determination parameter information is determination parameter information for out-of-coverage and/or determination parameter information for edge-of-coverage.

In the solution, when the network coverage determination parameter information includes a measurement threshold value, the network coverage determination parameter information may further include: a determination time length, herein the determination time length is a time length within which a measurement value of the D2D UE is required to meet a determination condition indicated by the measurement threshold value.

In the solution, the receiving unit may specifically be configured to receive the network coverage determination parameter information sent by the eNB through RRC-specific signalling or an SIB message.

In the solution, the D2D UE may further include:

a sending unit configured to send request information to the eNB, the request information being configured to request the eNB to send the network coverage determination parameter information.

In the solution, the sending unit may specifically be configured to, when a D2D service of the D2D UE is triggered, send the request information for the network coverage determination parameter information to the eNB; and/or, when it is determined that the D2D UE is located in an edge area of network coverage, send the request information for the network coverage determination parameter information to the eNB.

In the solution, the determination unit may specifically be configured to determine that the D2D UE's current position is in the edge area of the network coverage or an out-of-coverage area according to the network coverage determination parameter information.

In the solution, the determination unit may specifically be configured to determine a network coverage condition of the D2D UE's current position according to (a) measured RRM or RLM measurement value(s) of (a) signal(s) of a serving cell and/or a neighbouring cell and the network coverage determination parameter information;

or, when determining that the measured value(s) of the signal(s) of the serving cell and/or the neighbouring cell meet(s) the network coverage determination parameter information, report the RRM or RLM measurement value(s) of the signal(s) of the serving cell and/or the neighbouring cell to the eNB, and determine the network coverage condition of the D2D UE's current position according to indication information sent by the eNB.

In the solution, the sending unit may further be configured to send network coverage condition information to the eNB, herein the network coverage condition information may include at least one of: out-of-coverage indication information, edge-of-coverage indication information, and the RRM or RLM measurement value(s), measured by the D2D UE, of the signal(s) of the serving cell and/or the neighbouring cell;

the RRM measurement value or the RLM measurement value may include: RSRP and/or RSRQ.

In the solution, the sending unit may specifically be configured to send the network coverage condition information to the eNB according to an indication, issued by the eNB, of reporting the network coverage condition information, herein the eNB issues the indication to the D2D UE through an SIB message, or RRC-specific signalling, or a MAC CE or DCI of a PDCCH.

In the solution, the sending unit may further be configured to, when determining that the D2D UE's position is in the out-of-coverage area or the edge area of the network coverage, send D2D information by virtue of a resource pool for out-of-coverage; and/or the receiving unit may further be configured to, when determining that the D2D UE's position is in the out-of-coverage area or the edge area of the network coverage, receive D2D information by virtue of the resource pool for out-of-coverage.

In the solution, the D2D UE may further include: a processing unit configured to, if the network coverage determination parameter information sent by the eNB is not received, determine, after a Radio Link Failure (RLF) is detected through RLM measurement, that the D2D UE's current position is in the out-of-coverage area, and enable the sending unit to send and/or the receiving unit to receive the D2D information by virtue of a D2D resource.

The disclosure further provides an eNB, which may include:

a processing unit configured to enable a sending unit to send network coverage determination parameter information; and the sending unit configured to send the network coverage determination parameter information to D2D UE located in a serving cell for the D2D UE to detect a network coverage condition of the D2D UE's position according to the network coverage determination parameter information.

In the solution, the network coverage determination parameter information may include at least one of:

an RRM measurement threshold value, the RRM measurement threshold value including RSRP and/or RSRQ;

an RLM measurement threshold value, the RLM measurement threshold value being an SINR value or a BLER value;

an RLM measurement parameter, the RLM measurement parameter including an N310 value and/or a T310 value and/or an N311 value; and indication information, the indication information representing that the network coverage determination parameter information is determination parameter information for out-of-coverage and/or determination parameter information for edge-of-coverage.

In the solution, when the network coverage determination parameter information includes a measurement threshold value, the network coverage determination parameter information may further include: a determination time length, herein the determination time length is a time length within which a measurement value of the D2D UE is required to meet a determination condition indicated by the measurement threshold value.

In the solution, the processing unit may specifically be configured to, when request information sent by the D2D UE is received, enable the sending unit to send the network coverage determination parameter information to the D2D UE located in the serving cell, the request information being configured to request the eNB to send the network coverage determination parameter information; and/or when it is determined that the D2D UE is located on an edge of the cell, enable the sending unit to actively send the network coverage determination parameter information to the D2D UE; and/or enable the sending unit to send the network coverage determination parameter information to all D2D UE in the cell.

In the solution, the eNB may further include: a determination unit configured to determine the network coverage condition of the D2D UE according to (an) RRM or RLM measurement value(s), reported by the D2D UE, of (a) signal(s) of the serving cell and/or a neighbouring cell, and send indication information to the D2D UE.

In the solution, the sending unit may specifically be configured to issue an indication of reporting network coverage condition information to the D2D UE through an SIB message, RRC-specific signalling, a MAC CE or DCI of a PDCCH.

The disclosure provides a system for detecting network coverage condition, which may include: D2D UE and an eNB, herein the D2D UE is the D2D UE in the abovementioned solution; and the eNB is the eNB in the abovementioned solution.

According to the method, device and system for detecting network coverage condition provided by the disclosure, the network coverage condition of the current position is detected according to the network coverage determination parameter information sent by the eNB; and furthermore, the D2D UE may opportunely detect its movement out of the network coverage, and is timely switched to use a D2D communication resource. Therefore, the service continuity and quality of service of D2D communication may be ensured, and control of the eNB over the D2D communication resource of the D2D UE may be ensured.

DETAILED DESCRIPTION

The disclosure will be further described below with reference to the drawings and specific embodiments in detail.

Embodiment 1

Figure 1:
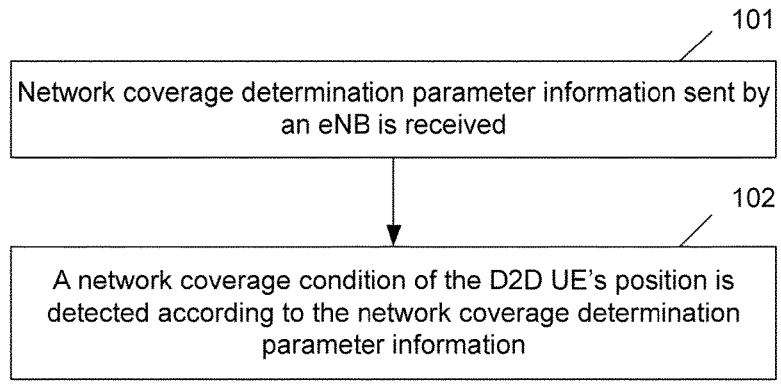
FIG. 1 is a first flowchart of a method for detecting network coverage condition according to an embodiment of the disclosure.

In a method for detecting network coverage condition of the embodiment, an operating flow of a D2D UE side, as shown in FIG. 1, includes the following steps.

In Step 101: D2D UE receives network coverage determination parameter information sent by an eNB.

Specifically: the D2D UE may send request information for the network coverage determination parameter information to the eNB for the eNB to send the network coverage determination parameter information to the D2D UE;

or: the eNB may send the network coverage determination parameter information to all D2D UE served in its cell.

or: the eNB may send the network coverage determination parameter information to all the D2D UE served in its cell or D2D UE in D2D communication.

Herein, the operation that the D2D UE sends the request information for the network coverage determination parameter information may be implemented as follows: the D2D UE sends the request information when a D2D service is triggered.

In an embodiment, the D2D UE may receive the network coverage determination parameter information through RRC-specific signalling or an SIB message.

When the network coverage determination parameter information is determination parameter information for out-of-coverage, the network coverage determination parameter information includes at least one of:

an RRM measurement threshold value, the RRM measurement threshold value including RSRP and/or RSRQ;

an RLM measurement threshold value, the RLM measurement threshold value being an SINR value or a BLER value and the SINR value or the BLER value optionally including an in threshold value Qin and out threshold value Qout for D2D communication;

an RLM measurement parameter, the RLM measurement parameter including an N310 value and/or a T310 value and/or an N311 value; and indication information, the indication information representing that the network coverage determination parameter information is the determination parameter information for out-of-coverage and/or determination parameter information for edge-of-coverage.

Herein, the RRM measurement threshold value may include: 1) a threshold value of a measurement reporting event A2, herein the threshold value may be RSRP and/or RSRQ; 2) a determination threshold value, herein the threshold value may be RSRP and/or RSRQ; and 3) an S-measure threshold value, which may be RSRP and/or RSRQ.

When the network coverage determination parameter information includes a measurement threshold value, the network coverage determination parameter information further includes: a determination time length, herein the determination time length is a time length within which a measurement value of the D2D UE is required to meet a determination condition indicated by the network coverage condition determination threshold value or the S-measure threshold value.

In Step 102: the D2D UE detects a network coverage condition of the D2D UE's position according to the network coverage determination parameter information.

Specifically, the step may include, but not limited to, the following conditions:

Condition 1: a signal condition of a serving cell of the D2D UE meets the threshold value of the measurement reporting event or measurement threshold value in the RRM measurement threshold value in the network coverage determination parameter information, that is, (an) RSRP and/or RSRQ value(s) of the serving cell are/is lower than the threshold value of the measurement reporting event or the determination threshold value or the S-measure threshold value within a specific time length, or the RSRP and/or RSRQ measurement value(s) of the serving cell are/is lower than the threshold value of the measurement reporting event, or the determination threshold value or the S-measure threshold value within the specific time length;

Condition 2: the condition in Condition 1 is met, and a signal of a neighbouring cell is not detected;

Condition 3: the condition in Condition 1 is met, the signal of the neighbouring cell is detected, but the signal of the neighbouring cell does not meet a condition for handover of the cell to the neighbouring cell, herein the condition for handover to the neighbouring cell may include: an RRM measurement event condition, or the signal of the neighbouring cell is higher than a specific threshold value, or the serving cell is lower than the specific threshold value; and Condition 4: the signal condition of the serving cell of the D2D UE meets a condition of RLF determination executed according to the RLM measurement threshold value or RLM measurement parameter in the network coverage determination parameter information, that is, the UE starts a T310 timer after detecting N310 Qout, and does not detect N311 Qin before expiration of T310.

In an embodiment, when it is determined that the D2D UE is currently located in an out-of-coverage area by determination in Step 102, the D2D UE may start acquiring a D2D sending resource from a resource pool for out-of-coverage in a contention-based resource acquisition manner.

In an embodiment, after Step 102 is implemented, the flow may further include the following step that: the D2D UE reports network coverage condition information determined on the basis of RRM measurement and the network coverage determination parameter information to the eNB.

Herein, the network coverage condition information includes at least one of: an out-of-coverage indication, and the RRM measurement value(s) or RLM measurement value(s), measured by the D2D UE, of the signal(s) of the serving cell and/or the neighbouring cell, herein the RRM measurement value includes: an RSRP value and/or an RSRQ value, and the RLM measurement value includes: an SINR value and/or a BLER value.

Obviously, according to the method, the network coverage condition of the current position is detected according to the network coverage determination parameter information sent by the eNB; and furthermore, the D2D UE may opportunely detect its movement out of the network coverage, and is timely switched to use a D2D communication resource. Therefore, the service continuity and quality of service of D2D communication may be ensured, and control of the eNB over the D2D communication resource of the D2D UE may be ensured.

Embodiment 2

In a method for detecting network coverage condition of the embodiment, an operating flow of an eNB side includes that: an eNB sends network coverage determination parameter information to D2D UE located in its serving cell for the D2D UE to detect a network coverage condition of the D2D UE's position according to the network coverage determination parameter information.

Here, the network coverage determination parameter information includes at least one of:

an RRM measurement threshold value, the RRM measurement threshold value including RSRP and/or RSRQ;

an RLM measurement threshold value, the RLM measurement threshold value being an SINR value or a BLER value and the SINR value or the BLER value optionally including an in threshold value Qin and out threshold value Qout for D2D communication;

an RLM measurement parameter, the RLM measurement parameter including an N310 value and/or a T310 value and/or an N311 value; and indication information, the indication information representing that the network coverage determination parameter information is determination parameter information for out-of-coverage and/or determination parameter information for edge-of-coverage.

Herein, the RRM measurement threshold value may include: 1) a threshold value of a measurement reporting event A2, herein the threshold value may be RSRP and/or RSRQ; 2) a determination threshold value, herein the threshold value may be RSRP and/or RSRQ; and 3) an S-measure threshold value, which may be RSRP and/or RSRQ.

In an embodiment, when the network coverage determination parameter information includes a measurement threshold value, the network coverage determination parameter information further includes: a determination time length, herein the determination time length is a time length within which a measurement value of the D2D UE is required to meet a determination condition indicated by the network coverage condition determination threshold value or the S-measure threshold value.

In an embodiment, the step that the eNB sends the network coverage determination parameter information to the D2D UE located in its serving cell includes that:

when receiving request information sent by the D2D UE, the eNB sends the network coverage determination parameter information to the D2D UE located in its serving cell, the request information being configured to request the eNB to send the network coverage determination parameter information;

and/or, when determining that the D2D UE is located on an edge of the cell, the eNB actively sends the network coverage determination parameter information to the D2D UE;

and/or, the eNB sends the network coverage determination parameter information to all D2D UE in the cell.

In an embodiment, the flow further includes that: the eNB determines the network coverage condition of the D2D UE according to (an) RRM or RLM measurement value(s), reported by the D2D UE, of (a) signal(s) of the serving cell and/or a neighbouring cell, and sends indication information to the D2D UE for the D2D UE to determine a network coverage condition of the D2D UE's current position according to the indication information sent by the eNB.

In an embodiment, the flow further includes that: the eNB issues an indication of reporting network coverage condition information to the D2D UE through an SIB message, RRC-specific signalling, a MAC CE or DCI of a PDCCH.

Embodiment 3

Figure 2:
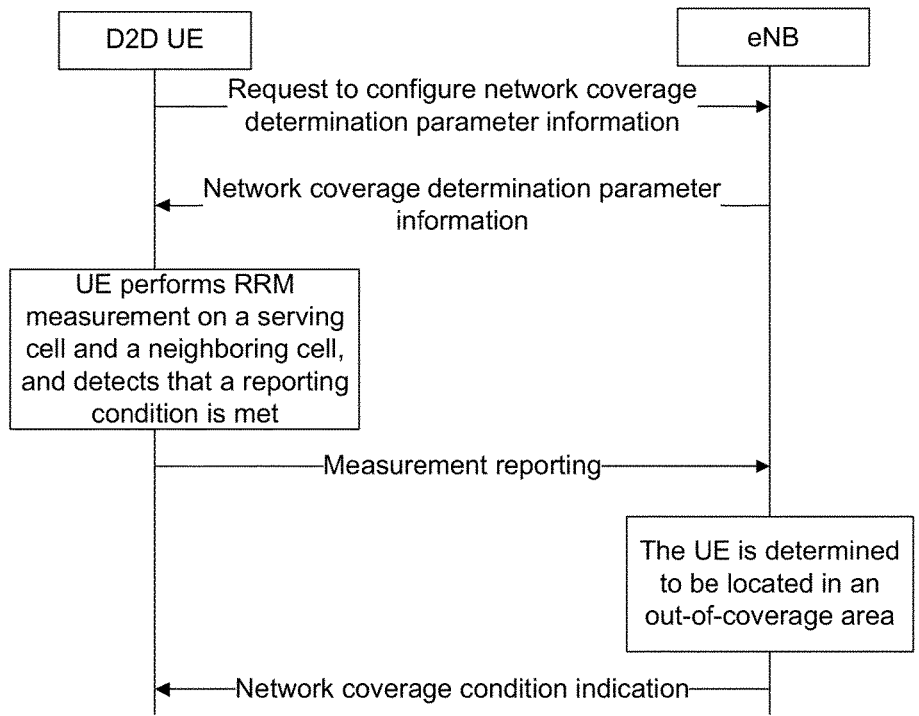
FIG. 2 is a second flowchart of a method for detecting network coverage condition according to an embodiment of the disclosure.

The embodiment describes a method for detecting network coverage condition in which D2D UE reports an RRM measurement value or an RLM measurement value to an eNB and the eNB determines and indicates whether the D2D UE is located in an out-of-coverage area or not to the D2D UE, and as shown in FIG. 2, the method includes the following steps.

In Step 201: the D2D UE receives network coverage determination parameter information sent by the eNB.

Optionally, the D2D UE may make a request for the network coverage determination parameter information to the eNB before executing Step 201. For example, the D2D UE may send network coverage condition determination request information to the eNB based on D2D service triggering.

The network coverage determination parameter information sent by the evolved Node may specifically be sent as follows: the eNB may send the network coverage determination parameter information to the D2D UE on the basis of the request of the D2D UE, or, send the network coverage determination parameter information to all D2D UE served by a cell, or, send the network coverage determination parameter information to all the D2D UE served by the cell or D2D UE in D2D communication.

Correspondingly, the D2D UE may receive the network coverage determination parameter information through RRC-specific signalling or an SIB message.

When the network coverage determination parameter information is determination parameter information for out-of-coverage, the network coverage determination parameter information includes at least one of:

an RRM measurement threshold value, the RRM measurement threshold value including RSRP and/or RSRQ;

an RLM measurement threshold value, the RLM measurement threshold value being an SINR value or a BLER value and the SINR value or the BLER value optionally including an in threshold value Qin and out threshold value Qout for D2D communication;

an RLM measurement parameter, the RLM measurement parameter including an N310 value and/or a T310 value and/or an N311 value; and indication information, the indication information representing that the network coverage determination parameter information is the determination parameter information for out-of-coverage and/or determination parameter information for edge-of-coverage.

Herein, the RRM measurement threshold value may include: 1) a threshold value of a measurement reporting event A2, herein the threshold value may be RSRP and/or RSRQ; 2) a determination threshold value, herein the threshold value may be RSRP and/or RSRQ; and 3) an S-measure threshold value, which may be RSRP and/or RSRQ.

When the network coverage determination parameter information includes a measurement threshold value, the network coverage determination parameter information further includes: a determination time length, herein the determination time length is a time length within which a measurement value of the D2D UE is required to meet a determination condition indicated by the network coverage condition determination threshold value or the S-measure threshold value.

In Step 202: the D2D UE acquires (an) RRM measurement value(s) or RLM measurement value(s) of the serving cell and/or a neighbouring cell, and determines that the measurement value(s) meet(s) a preset reporting threshold value according to the network coverage determination parameter information.

In Step 203: the D2D UE reports RSRP and/or RSRQ measurement value(s) of the serving cell and/or the neighbouring cell to the eNB as the RRM measurement value(s) or the RLM measurement value(s) according to received measurement reporting configuration information.

Herein, the measurement reporting configuration information may be information issued to the UE by the eNB in advance.

In Step 204: after determining that the D2D UE is located in the out-of-coverage area according to the RRM measurement value(s) or the RLM measurement value(s), the eNB sends network coverage condition indication information to the D2D UE.

Optionally, the eNB may make a determination in combination with locally stored geographical position information. The operation that the eNB makes a determination according to the RRM measurement value(s) or RLM measurement value(s) reported by the D2D UE specifically includes, but not limited to, the following conditions:

Condition 1: a signal condition of a serving cell of the D2D UE meets the threshold value of the measurement reporting event or measurement threshold value in the RRM measurement threshold value in the network coverage determination parameter information, that is, the RSRP and/or RSRQ value(s) of the serving cell are/is lower than the threshold value of the measurement reporting event or the determination threshold value or the S-measure threshold value within a specific time length, or the RSRP and/or RSRQ measurement value(s) of the serving cell are/is lower than the threshold value of the measurement reporting event, or the determination threshold value or the S-measure threshold value within the specific time length;

Condition 2: the condition in Condition 1 is met, and a signal of the neighbouring cell is not detected;

Condition 3: the condition in Condition 1 is met, the signal of the neighbouring cell is detected, but the signal of the neighbouring cell does not meet a condition for handover of the cell to the neighbouring cell, herein the condition for handover to the neighbouring cell may include: an RRM measurement event condition, or the signal of the neighbouring cell is higher than a specific threshold value, or the serving cell is lower than the specific threshold value; and Condition 4: the signal condition of the serving cell of the D2D UE meets a condition of RLF determination executed according to the RLM measurement threshold value or RLM measurement parameter in the network coverage determination parameter information, that is, the UE starts a T310 timer after detecting N310 Qout, and does not detect N311 Qin before expiration of T310.

The D2D UE receives the indication information, and starts acquiring a D2D sending resource from a resource pool for out-of-coverage in a contention-based resource acquisition manner.

Figure 3:
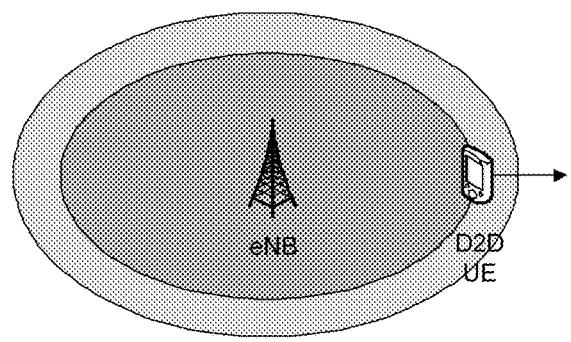
FIG. 3 is a first diagram of an application scenario according to an embodiment of the disclosure.

An application scenario of the embodiment of the disclosure will be described below. As shown in FIG. 3, D2D UE is located within cellular network coverage of the eNB, and the eNB allocates a D2D sending resource to the D2D UE in a dynamic manner or a semi-persistent manner. When the D2D UE gradually moves out of the coverage of the eNB and the D2D UE does not detect signals of other cells, it is considered that the D2D UE is located in an out-of-coverage area, and the D2D UE starts obtaining a D2D sending resource in a contention-based manner.

Figure 4:
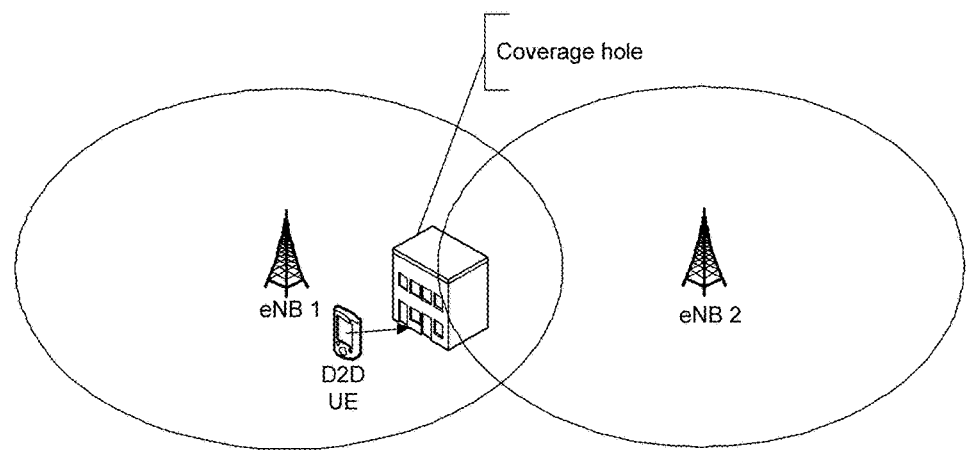
FIG. 4 is a second diagram of an application scenario according to an embodiment of the disclosure.

Also as shown in FIG. 4, D2D UE is located within cellular network coverage of a cell of an eNB, and the eNB allocates a D2D sending resource to the D2D UE in a dynamic manner or a semi-persistent manner. The D2D UE moves into a building from an outdoor space, a signal of eNB1 in the building is very weak, and a signal, detected by the D2D UE, of eNB2 is not strong enough for the D2D UE to be handed over to eNB2. That is, there exists a coverage hole in the building. After entering the coverage hole, the D2D UE may not obtain a D2D sending resource allocated without contention from eNB1, and starts obtaining a D2D sending resource in a contention-based manner.

Figure 5:
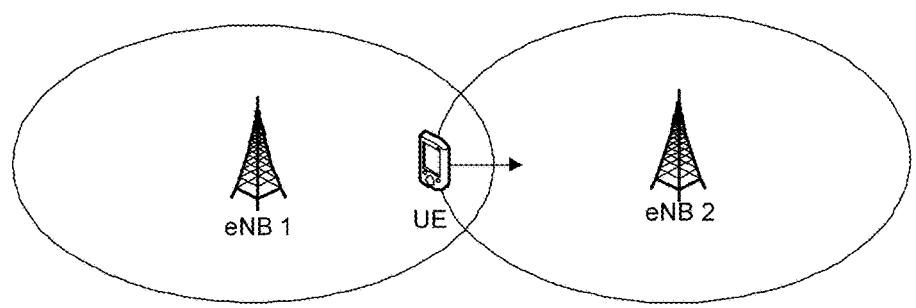
FIG. 5 is a third diagram of an application scenario according to an embodiment of the disclosure.

Also as shown in FIG. 5, UE is located within cellular network coverage of eNB1, and eNB1 allocates a D2D sending resource to the UE in a dynamic manner or a semi-persistent manner. The UE gradually moves from the coverage of eNB1 to coverage of eNB2. The UE detects a signal of eNB2 after moving to an edge of eNB1, and eNB1 may hand the UE over eNB2. In such a scenario, movement of the UE out of eNB1 does not mean that there is no network coverage, and the UE is not required to start obtaining a D2D sending resource in a contention-based manner. In case of a cell handover failure of the UE, the D2D UE detects occurrence of an RLF. After detecting the RLF, the UE starts obtaining a D2D sending resource in the contention-based manner until the D2D UE obtains a resource from an eNB without contention after finishing RRC reconstruction or RRC connection establishment.

Embodiment 4

Figure 6:
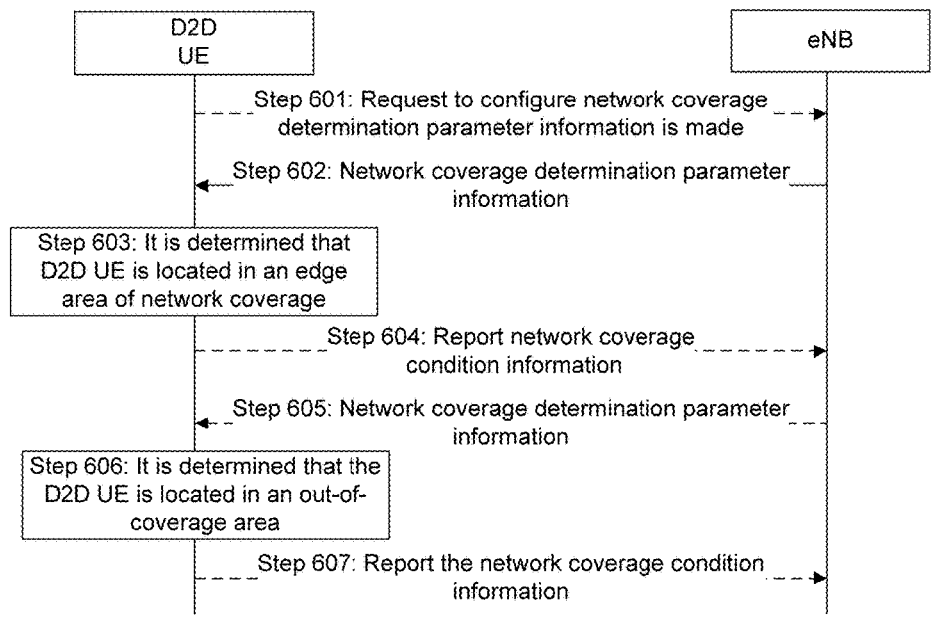
FIG. 6 is a third flowchart of a method for detecting network coverage condition according to an embodiment of the disclosure.

The embodiment describes a method for detecting network coverage condition in which D2D UE independently determines whether it is located on an edge of network coverage and an out-of-coverage area or not according to an RRM measurement value or an RLM measurement value. FIG. 6 is a flowchart of the embodiment, and the flow includes the following steps.

In Step 601: the D2D UE makes a request for network coverage determination parameter information to the eNB.

Specifically, the D2D UE may send network coverage condition determination request information to the eNB based on D2D service triggering.

In Step 602: the eNB sends the network coverage determination parameter information to the D2D UE.

The eNB may send the network coverage determination parameter information to the D2D UE on the basis of the request of the D2D UE, or send the network coverage determination parameter information to all D2D UE served by a cell, or send the network coverage determination parameter information to all the D2D UE served by the cell or D2D UE in D2D communication. The D2D UE may receive the network coverage determination parameter information through RRC-specific signalling or an SIB message.

The network coverage determination parameter information is determination parameter information for edge-of-coverage and/or determination parameter information for out-of-coverage, including at least one of:

an RRM measurement threshold value, the RRM measurement threshold value including RSRP and/or RSRQ;

an RLM measurement threshold value, the RLM measurement threshold value being an SINR value or a BLER value and the SINR value or the BLER value optionally including an in threshold value Qin and out threshold value Qout for D2D communication;

an RLM measurement parameter, the RLM measurement parameter including an N310 value and/or a T310 value and/or an N311 value; and indication information, the indication information representing that the network coverage determination parameter information is the determination parameter information for out-of-coverage and/or the determination parameter information for edge-of-coverage.

Herein, the RRM measurement threshold value may include: 1) a threshold value of a measurement reporting event A2, herein the threshold value may be RSRP and/or RSRQ; 2) a determination threshold value, herein the threshold value may be RSRP and/or RSRQ; and 3) an S-measure threshold value, which may be RSRP and/or RSRQ.

When the network coverage determination parameter information includes a measurement threshold value, the network coverage determination parameter information further includes: a determination time length, herein the determination time length is a time length within which a measurement value of the D2D UE is required to meet a determination condition indicated by the network coverage condition determination threshold value or the S-measure threshold value.

In Step 603: the D2D UE determines that it is located in an edge area of network coverage according to RRM measurement values or RLM measurement values and the received network coverage determination parameter information.

The following conditions may specifically be included without limitations:

Condition 1: a signal condition of a serving cell of the D2D UE meets the threshold value of the measurement reporting event or measurement threshold value in the RRM measurement threshold value in the network coverage determination parameter information, that is, the RSRP and/or RSRQ value(s) of the serving cell are/is lower than the threshold value of the measurement reporting event or the determination threshold value or the S-measure threshold value within a specific time length, or the RSRP and/or RSRQ measurement value(s) of the serving cell are/is lower than the threshold value of the measurement reporting event, or the determination threshold value or the S-measure threshold value within the specific time length;

Condition 2: the condition in Condition 1 is met, and a signal of a neighbouring cell is not detected;

Condition 3: the condition in Condition 1 is met, the signal of the neighbouring cell is detected, but the signal of the neighbouring cell does not meet a condition for handover of the cell to the neighbouring cell, herein the condition for handover to the neighbouring cell may include: an RRM measurement event condition, or the signal of the neighbouring cell is higher than a specific threshold value, or the serving cell is lower than the specific threshold value; and Condition 4: the signal condition of the serving cell of the D2D UE meets a condition of RLF determination executed according to the RLM measurement threshold value or RLM measurement parameter in the network coverage determination parameter information, that is, the UE starts a T310 timer after detecting N310 Qout, and does not detect N311 Qin before expiration of T310.

Optionally, the D2D UE starts receiving D2D information by virtue of a resource pool for out-of-coverage after determining that it is located in an out-of-coverage area.

In Step 604: the D2D UE reports network coverage condition information obtained on the basis of RRM measurement and the network coverage determination parameter information to the eNB.

The network coverage condition information includes at least one of: an out-of-coverage indication, a determination parameter information for out-of-coverage request indication, and the RRM measurement value(s) or RLM measurement value(s), measured by the D2D UE, of the signal(s) of the serving cell and/or the neighbouring cell, herein the RRM measurement value or the RLM measurement value includes: (an) RSRP and/or RSRQ value(s).

Optionally, the flow may further include the following steps.

In Step 605: if the network coverage determination parameter information sent in Step 602 does not include the determination parameter information for out-of-coverage, the eNB sends the determination parameter information for out-of-coverage to the D2D UE.

The eNB may send the determination parameter information for out-of-coverage to the D2D UE on the basis of an explicit determination parameter information for out-of-coverage request indication received from the D2D UE; or the eNB sends the determination parameter information for out-of-coverage to the D2D UE after receiving the network coverage condition information which is reported by the D2D UE and indicates that the D2D UE is located on an edge of network coverage.

In Step 606: the D2D UE determines that it is located in the out-of-coverage area according to the RRM measurement values or the RLM measurement values and the received determination parameter information for out-of-coverage.

The D2D UE may make a determination according to the RRM measurement value(s) or RLM measurement value(s) of the serving cell and/or the neighbouring cell, specifically including, but not limited to, the following conditions:

Condition 1: the signal condition of the serving cell of the D2D UE meets the threshold value of the measurement reporting event or measurement threshold value in the RRM measurement threshold value in the network coverage determination parameter information, that is, the RSRP and/or RSRQ value(s) of the serving cell are/is lower than the threshold value of the measurement reporting event or the determination threshold value or the S-measure threshold value within a specific time length, or the RSRP and/or RSRQ measurement value(s) of the serving cell are/is lower than the threshold value of the measurement reporting event, or the determination threshold value or the S-measure threshold value within the specific time length;

Condition 2: the condition in Condition 1 is met, and the signal of the neighbouring cell is not detected;

Condition 3: the condition in Condition 1 is met, the signal of the neighbouring cell is detected, but the signal of the neighbouring cell does not meet the condition for handover of the cell to the neighbouring cell, herein the condition for handover to the neighbouring cell may include: the RRM measurement event condition, or the signal of the neighbouring cell is higher than the specific threshold value, or the serving cell is lower than the specific threshold value; and Condition 4: the signal condition of the serving cell of the D2D UE meets the condition of RLF determination executed according to the RLM measurement threshold value or RLM measurement parameter in the network coverage determination parameter information, that is, the UE starts the T310 timer after detecting N310 Qout, and does not detect N311 Qin before expiration of T310.

The D2D UE starts acquiring a D2D sending resource from a resource pool for out-of-coverage in a contention-based resource acquisition manner after determining that it is located in the out-of-coverage area.

In Step 607: the D2D UE reports the network coverage condition information obtained on the basis of RRM measurement and the network coverage determination parameter information to the eNB.

The network coverage condition information includes at least one of: the out-of-coverage indication, and the RRM measurement value(s) or RLM measurement value(s), measured by the D2D UE, of the serving cell and/or the neighbouring cell, herein the RRM measurement value or the RLM measurement value includes: the RSRP and/or RSRQ value(s).

Embodiment 5

Figure 7:
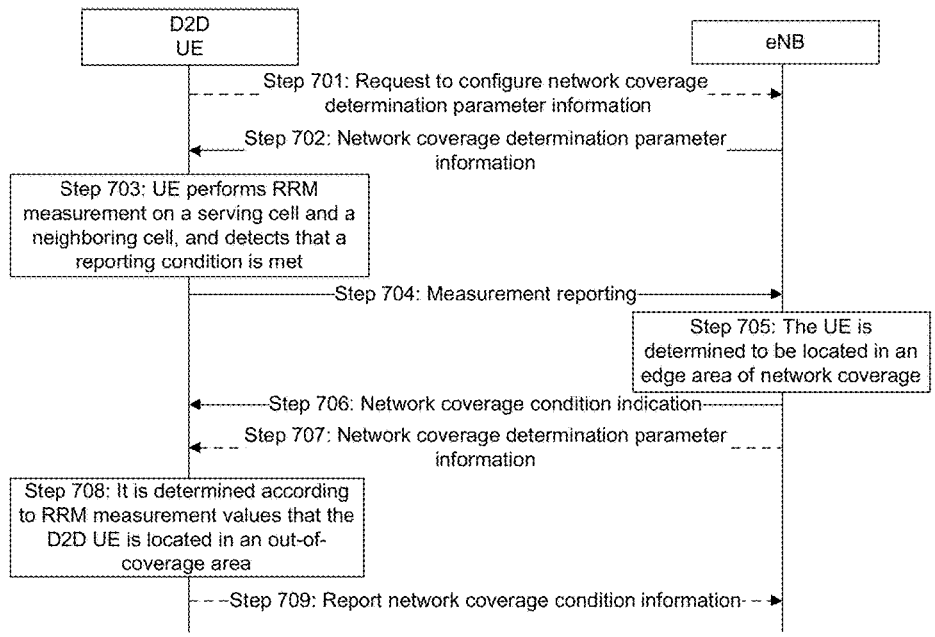
FIG. 7 is a fourth flowchart of a method for detecting network coverage condition according to an embodiment of the disclosure.

The embodiment describes a method for detecting network coverage condition in which D2D UE reports an RRM measurement value or an RLM measurement value to an eNB, the eNB determines and indicates whether the D2D UE is located in an edge area of network coverage or not to the D2D UE and the D2D UE independently determines whether it is located in an out-of-coverage area or not according to the RRM measurement value or the RLM measurement value. FIG. 7 is a flowchart of the embodiment, and the flow includes the following steps.

In Step 701: the D2D UE makes a request for network coverage determination parameter information to the eNB.

Specifically, the D2D UE may send network coverage condition determination request information to the eNB based on D2D service triggering.

In Step 702: the eNB sends the network coverage determination parameter information to the D2D UE.

The eNB may send the network coverage determination parameter information to the D2D UE on the basis of the request of the D2D UE, or send the network coverage determination parameter information to all D2D UE served by the cell, or send the network coverage determination parameter information to all the D2D UE served by the cell or D2D UE in D2D communication. The D2D UE may receive the network coverage determination parameter information through RRC-specific signalling or an SIB message. The network coverage determination parameter information is determination parameter information for edge-of-coverage and/or determination parameter information for out-of-coverage. The network coverage determination parameter information includes at least one of:

an RRM measurement threshold value, the RRM measurement threshold value including RSRP and/or RSRQ;

an RLM measurement threshold value, the RLM measurement threshold value being an SINR value or a BLER value and the SINR value or the BLER value optionally including an in threshold value Qin and out threshold value Qout for D2D communication;

an RLM measurement parameter, the RLM measurement parameter including an N310 value and/or a T310 value and/or an N311 value; and indication information, the indication information representing that the network coverage determination parameter information is the determination parameter information for out-of-coverage and/or the determination parameter information for edge-of-coverage.

Herein, the RRM measurement threshold value may include: 1) a threshold value of a measurement reporting event A2, herein the threshold value may be RSRP and/or RSRQ; 2) a determination threshold value, herein the threshold value may be RSRP and/or RSRQ; and 3) an S-measure threshold value, which may be RSRP and/or RSRQ.

When the network coverage determination parameter information includes a measurement threshold value, the network coverage determination parameter information further includes: a determination time length, herein the determination time length is a time length within which a measurement value of the D2D UE is required to meet a determination condition indicated by the network coverage condition determination threshold value or the S-measure threshold value. The network coverage determination parameter information may further include configuration information about measurement reporting of the D2D UE when it is detected that the determination condition is met.

In Step 703: the D2D UE executes RRM measurement on a serving cell and/or a neighbouring cell, and detects that a reporting condition is met.

In Step 704: the D2D UE reports RSRP and/or RSRQ measurement value(s) of the serving cell and/or the neighbouring cell to the eNB as RRM measurement value(s) or RLM measurement value(s) according to the received measurement reporting configuration information.

In Step 705: the eNB determines that the D2D UE is located in the edge area of the network coverage according to the RRM measurement value(s) or RLM measurement value(s) reported by the D2D UE.

Optionally, the eNB may also make a determination in combination with locally stored geographical position information. The operation that the eNB makes a determination according to the RRM measurement value(s) or RLM measurement value(s) reported by the D2D UE specifically includes, but not limited to, the following conditions:

Condition 1: a signal condition of the serving cell of the D2D UE meets the threshold value of the measurement reporting event or measurement threshold value in the RRM measurement threshold value in the network coverage determination parameter information, that is, the RSRP and/or RSRQ value(s) of the serving cell are/is lower than the threshold value of the measurement reporting event or the determination threshold value or the S-measure threshold value within a specific time length, or the RSRP and/or RSRQ measurement value(s) of the serving cell are/is lower than the threshold value of the measurement reporting event, or the determination threshold value or the S-measure threshold value within the specific time length;

Condition 2: the condition in Condition 1 is met, and a signal of the neighbouring cell is not detected;

Condition 3: the condition in Condition 1 is met, the signal of the neighbouring cell is detected, but the signal of the neighbouring cell does not meet a condition for handover of the cell to the neighbouring cell, herein the condition for handover to the neighbouring cell may include: an RRM measurement event condition, or the signal of the neighbouring cell is higher than a specific threshold value, or the serving cell is lower than the specific threshold value; and Condition 4: the signal condition of the serving cell of the D2D UE meets a condition of RLF determination executed according to the RLM measurement threshold value or RLM measurement parameter in the network coverage determination parameter information, that is, the UE starts a T310 timer after detecting N310 Qout, and does not detect N311 Qin before expiration of T310.

In Step 706: the eNB sends network coverage condition indication information to the D2D UE after determining that the D2D UE is located in the out-of-coverage area according to the RRM measurement value(s) or RLM measurement value(s) reported by the D2D UE. Optionally, the D2D UE starts receiving D2D information in a resource pool for out-of-coverage after receiving the indication information and determining that the D2D UE is located in the out-of-coverage area.

In Step 707: optionally, if the network coverage determination parameter information sent in Step 702 does not include the determination parameter information for out-of-coverage, the eNB sends the determination parameter information for out-of-coverage to the D2D UE.

In Step 708: the D2D UE determines that it is located in the out-of-coverage area according to the RRM measurement value(s) or the RLM measurement value(s) and the received determination parameter information for out-of-coverage. The D2D UE may make a determination according to the RRM measurement value(s) or RLM measurement value(s) of the serving cell and/or the neighbouring cell, specifically including, but not limited to, the following conditions:

Condition 1: the signal condition of the serving cell of the D2D UE meets the threshold value of the measurement reporting event or measurement threshold value in the RRM measurement threshold value in the network coverage determination parameter information, that is, the RSRP and/or RSRQ value(s) of the serving cell are/is lower than the threshold value of the measurement reporting event or the determination threshold value or the S-measure threshold value within a specific time length, or the RSRP and/or RSRQ measurement value(s) of the serving cell are/is lower than the threshold value of the measurement reporting event, or the determination threshold value or the S-measure threshold value within the specific time length;

Condition 2: the condition in Condition 1 is met, and the signal of the neighbouring cell is not detected;

Condition 3: the condition in Condition 1 is met, the signal of the neighbouring cell is detected, but the signal of the neighbouring cell does not meet the condition for handover of the cell to the neighbouring cell, herein the condition for handover to the neighbouring cell may include: the RRM measurement event condition, or the signal of the neighbouring cell is higher than the specific threshold value, or the serving cell is lower than the specific threshold value; and Condition 4: the signal condition of the serving cell of the D2D UE meets the condition of RLF determination executed according to the RLM measurement threshold value or RLM measurement parameter in the network coverage determination parameter information, that is, the UE starts the T310 timer after detecting N310 Qout, and does not detect N311 Qin before expiration of T310.

The D2D UE starts acquiring a D2D sending resource from a resource pool for out-of-coverage in a contention-based resource acquisition manner after determining that it is located in the out-of-coverage area.

In Step 709: optionally, the D2D UE reports network coverage condition information obtained on the basis of RRM measurement and the network coverage determination parameter information to the eNB. The network coverage condition information includes at least one of: an out-of-coverage indication, and the RRM measurement value(s) or RLM measurement value(s), measured by the D2D UE, of the serving cell and/or the neighbouring cell, herein the RRM measurement value or the RLM measurement value includes: the RSRP and/or RSRQ value(s).

Embodiment 6

Figure 8:
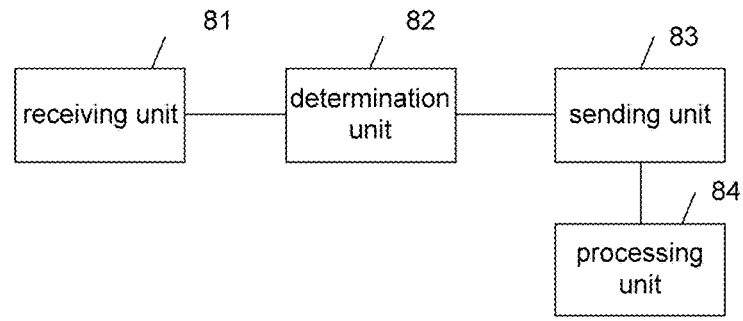
FIG. 8 is a structure diagram of D2D UE according to an embodiment of the disclosure.

The embodiment of the disclosure provides D2D UE, and as shown in FIG. 8, the D2D UE includes:

a receiving unit 81 configured to receive network coverage determination parameter information sent by an eNB; and a determination unit 82 configured to detect a network coverage condition of the D2D UE's position according to the network coverage determination parameter information.

Herein, the network coverage determination parameter information includes at least one of:

an RRM measurement threshold value, the RRM measurement threshold value including RSRP and/or RSRQ;

an RLM measurement threshold value, the RLM measurement threshold value being an SINR value or a BLER value and the SINR value or the BLER value optionally including an in threshold value Qin and out threshold value Qout for D2D communication;

an RLM measurement parameter, the RLM measurement parameter including an N310 value and/or a T310 value and/or an N311 value; and indication information, the indication information representing that the network coverage determination parameter information is determination parameter information for out-of-coverage and/or determination parameter information for edge-of-coverage.

Herein, the RRM measurement threshold value may include: 1) a threshold value of a measurement reporting event A2, herein the threshold value may be RSRP and/or RSRQ; 2) a determination threshold value, herein the threshold value may be RSRP and/or RSRQ; and 3) an S-measure threshold value, which may be RSRP and/or RSRQ.

When the network coverage determination parameter information includes a measurement threshold value, the network coverage determination parameter information further includes: a determination time length, herein the determination time length is a time length within which a measurement value of the D2D UE is required to meet a determination condition indicated by the network coverage condition determination threshold value or the S-measure threshold value.

The receiving unit is specifically configured to receive the network coverage determination parameter information sent by the eNB through RRC-specific signalling or an SIB message.

The D2D UE further includes: a sending unit 83 configured to send request information to the eNB, the request information being configured to request the eNB to send the network coverage determination parameter information.

The sending unit 83 is specifically configured to, when a D2D service of the D2D UE is triggered, send the request information for the network coverage determination parameter information to the eNB; and/or, when it is determined that the D2D UE is located in an edge area of network coverage, send the request information for the network coverage determination parameter information to the eNB.

The determination unit 82 is specifically configured to determine that the D2D UE's current position is in the edge area of the network coverage or an out-of-coverage area according to the network coverage determination parameter information.

The determination unit 82 is specifically configured to determine a network coverage condition of the D2D UE's current position according to (a) measured RRM or RLM measurement value(s) of (a) signal(s) of a serving cell and/or a neighbouring cell and the network coverage determination parameter information;

or, when determining that the measured value(s) of the signal(s) of the serving cell and/or the neighbouring cell meet(s) the network coverage determination parameter information, report the RRM or RLM measurement value(s) of the signal(s) of the serving cell and/or the neighbouring cell to the eNB, and determine the network coverage condition of the D2D UE's current position according to indication information sent by the eNB.

The sending unit 83 is further configured to send network coverage condition information to the eNB, herein the network coverage condition information includes at least one of: out-of-coverage indication information, edge-of-coverage indication information, and the RRM or RLM measurement value(s), measured by the D2D UE, of the signal(s) of the serving cell and/or the neighbouring cell; and the RRM measurement value or the RLM measurement value includes: RSRP and/or RSRQ.

The sending unit 83 is specifically configured to send the network coverage condition information to the eNB according to an indication, issued by the eNB, of reporting the network coverage condition information, herein the eNB issues the indication to the D2D UE through an SIB message, or RRC-specific signalling, or a MAC CE or DCI of a PDCCH.

The sending unit 83 is further configured to, when determining that the D2D UE's position is in the out-of-coverage area or the edge area of the network coverage, send D2D information by virtue of a resource pool for out-of-coverage; and/or, the receiving unit 81 is further configured to, when determining that the D2D UE's position is in the out-of-coverage area or the edge area of the network coverage, receive D2D information by virtue of the resource pool for out-of-coverage.

The D2D UE further includes: a processing unit 84 configured to, if the network coverage determination parameter information sent by the eNB is not received, determine that the D2D UE's current position is in the out-of-coverage area after an RLF is detected by RLM measurement, and enable the sending unit to send and/or the receiving unit to receive the D2D information by virtue of a D2D resource.

Embodiment 7

Figure 9:
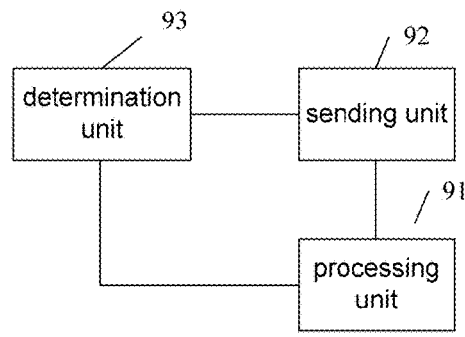
FIG. 9 is a structure diagram of an eNB according to an embodiment of the disclosure.

The embodiment of the disclosure further provides an eNB, which, as shown in FIG. 9, includes:

a sending unit 91 configured to send network coverage determination parameter information to D2D UE located in a serving cell for the D2D UE to detect a network coverage condition of the D2D UE's position according to the network coverage determination parameter information; and a processing unit 92 configured to enable the sending unit to send the network coverage determination parameter information.

Herein, the network coverage determination parameter information includes at least one of:

an RRM measurement threshold value, the RRM measurement threshold value including RSRP and/or RSRQ;

an RLM measurement threshold value, the RLM measurement threshold value being an SINR value or a BLER value and the SINR value or the BLER value optionally including an in threshold value Qin and out threshold value Qout for D2D communication;

an RLM measurement parameter, the RLM measurement parameter including an N310 value and/or a T310 value and/or an N311 value; and indication information, the indication information representing that the network coverage determination parameter information is determination parameter information for out-of-coverage and/or determination parameter information for edge-of-coverage.

Herein, the RRM measurement threshold value may include: 1) a threshold value of a measurement reporting event A2, herein the threshold value may be RSRP and/or RSRQ; 2) a determination threshold value, herein the threshold value may be RSRP and/or RSRQ; and 3) an S-measure threshold value, which may be RSRP and/or RSRQ.

When the network coverage determination parameter information includes a measurement threshold value, the network coverage determination parameter information further includes: a determination time length, herein the determination time length is a time length within which a measurement value of the D2D UE is required to meet a determination condition indicated by the network coverage condition determination threshold value or the S-measure threshold value.

The processing unit 92 is configured to, when request information sent by the D2D UE is received, enable the sending unit 91 to send the network coverage determination parameter information to the D2D UE located in the serving cell, the request information being configured to request the eNB to send the network coverage determination parameter information; and/or when it is determined that the D2D UE is located on an edge of the cell, enable the sending unit to actively send the network coverage determination parameter information to the D2D UE; and/or enable the sending unit to send the network coverage determination parameter information to all D2D UE in the cell.

The eNB further includes: a determination unit 93 configured to determine the network coverage condition of the D2D UE according to (an) RRM or RLM measurement value(s), reported by the D2D UE, of (a) signal(s) of the serving cell and/or a neighbouring cell, and send indication information to the D2D UE.

The sending unit 91 is specifically configured to issue an indication of reporting network coverage condition information to the D2D UE through an SIB message, RRC-specific signalling, a MAC CE or DCI of a PDCCH.

Embodiment 8

Figure 10:
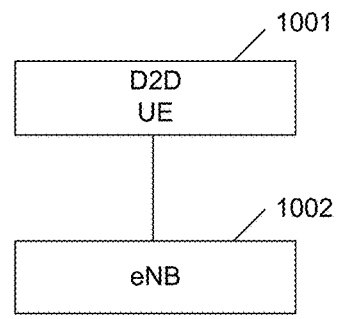
FIG. 10 is a structure diagram of a system for detecting network coverage condition according to an embodiment of the disclosure.

The embodiment of the disclosure provides a system for detecting network coverage condition, and as shown in FIG. 10, the system includes the D2D UE 1001 provided in embodiment 6 and the eNB 1002 provided in embodiment 7; and functions of the D2D UE and the eNB are the same as those described in the abovementioned embodiments, and will not be elaborated herein.

When being implemented in form of software function module and sold or used as independent products, each unit and subunits thereof in the device of the embodiment of the disclosure may also be stored in a computer-readable storage medium. Based on such an understanding, the technical solutions of the embodiment of the disclosure substantially or parts contributing to the conventional art may be embodied in form of software product, and the computer software product is stored in a storage medium, including a plurality of instructions configured to enable a piece of computer equipment (which may be a personal computer, a server, network equipment or the like) to execute all or part of the method of each embodiment of the disclosure. The storage medium includes: various media capable of storing program codes such as a U disk, a mobile hard disk, a Read-Only Memory (ROM), a Random Access Memory (RAM), a magnetic disk or a compact disc. Therefore, the embodiment of the disclosure is not limited to any specific hardware and software combination.

Correspondingly, the embodiment of the disclosure further provides a computer storage medium having stored therein computer programs configured to execute the method for detecting network coverage condition of the embodiment of the disclosure.

The above is only the preferred embodiment of the disclosure and not intended to limit the scope of protection of the disclosure.

INDUSTRIAL APPLICABILITY

According to the embodiment of the disclosure, the network coverage condition of the current position is detected according to the network coverage determination parameter information sent by the eNB; and furthermore, the D2D UE may opportunely detect its movement out of the network coverage, and is timely switched to use a D2D communication resource. Therefore, the service continuity and quality of service of D2D communication may be ensured, and control of the eNB over the D2D communication resource of the D2D UE may be ensured.

What is claimed is:

1. A method for detecting network coverage condition, comprising:
   receiving, by Device-to-Device (D2D) User Equipment (UE), network coverage determination parameter information sent by an Evolved Node B (eNB); and
   detecting, by the D2D UE, a network coverage condition of a position of the D2D UE according to the network coverage determination parameter information;
   wherein the network coverage determination parameter information comprises at least one of:
      a Radio Resource Management (RRM) measurement threshold value, the RRM measurement threshold value comprising Reference Signal Received Power (RSRP) and/or Reference Signal Received Quality (RSRQ);
      a Radio Link Monitoring (RLM) measurement threshold value, the RLM measurement threshold value being a Signal to Interference plus Noise Ratio (SINR) value or a Block Error Rate (BLER) value;
      an RLM measurement parameter, the RLM measurement parameter comprising at least one of an N310 value, a T310 value or an N311 value; or
      indication information, the indication information representing that the network coverage determination parameter information is determination parameter information for out-of-coverage and/or determination parameter information for edge-of-coverage.

2. The method according to claim 1, wherein when the network coverage determination parameter information comprises a measurement threshold value, the network coverage determination parameter information further comprises: a determination time length,
   wherein the determination time length is a time length within which a measurement value of the D2D UE is required to meet a determination condition indicated by the measurement threshold value.

3. The method according to claim 1, wherein receiving the network coverage determination parameter information sent by the eNB comprises:
   receiving, by the D2D UE, the network coverage determination parameter information sent by the eNB through Radio Resource Control (RRC)-specific signalling or a System Information Block (SIB) message.

4. The method according to claim 1, wherein receiving the network coverage determination parameter information sent by the eNB comprises at least one of:

sending, by the D2D UE, request information to the eNB, the request information being configured to request the eNB to send the network coverage determination parameter information;

when determining that the D2D UE is located on an edge of a cell, actively sending, by the eNB, the network coverage determination parameter information to the D2D UE, and correspondingly, receiving, by the D2D UE, the network coverage determination parameter information sent by the eNB; or sending, by the eNB, the network coverage determination parameter information to all D2D UE in the cell.

5. The method according to claim 4, wherein sending, by the D2D UE, the request information to the eNB comprises:

when a D2D service of the D2D UE is triggered, sending the request information for the network coverage determination parameter information to the eNB; and/or when the D2D UE determines that the D2D UE is located in an edge area of network coverage, sending, by the D2D UE, the request information for the network coverage determination parameter information to the eNB.

6. The method according to claim 1, wherein detecting, by the D2D UE, the network coverage condition of the position of the D2D UE according to the network coverage determination parameter information comprises:

determining, by the D2D UE, that a current position of the D2D UE is in an edge area of network coverage or an out-of-coverage area according to the network coverage determination parameter information.

7. The method according to claim 1, wherein detecting, by the D2D UE, the network coverage condition of the position of the D2D UE according to the network coverage determination parameter information comprises:

determining, by the D2D UE, a network coverage condition of a current position of the D2D UE according to
(a) measured RRM or RLM measurement value(s) of
(a) signal(s) of a serving cell and/or a neighbouring cell
and the network coverage determination parameter information; or when determining that the measured value(s) of the signal(s) of the serving cell and/or the neighbouring cell meet(s) the network coverage determination parameter information, reporting, by the D2D UE, the RRM or RLM measurement value(s) of the signal(s) of the serving cell and/or the neighbouring cell to the eNB for the eNB to determine the network coverage condition of the D2D UE according to the RRM or RLM measurement value(s) of the signal(s) of the serving cell and/or the neighbouring cell and to send the indication information to the D2D UE, and determining, by the D2D UE, the network coverage condition of the current position of the D2D UE according to the indication information sent by the eNB.

8. The method according to claim 7, further comprising: after determining, by the D2D UE, the network coverage condition of the current position of the D2D UE according to the RRM or RLM measurement value(s) of the signal(s) of the serving cell and/or the neighbouring cell and the network coverage determination parameter information, sending, by the D2D UE, network coverage condition information to the eNB, wherein the network coverage condition information comprises at least one of: out-of-coverage indication information, edge-of-coverage indication information, or the RRM or RLM measurement value(s), measured by the D2D UE, of the signal(s) of the serving cell and/or the neighbouring cell;

the RRM measurement value comprises: an RSRP value and/or an RSRQ value; and the RLM measurement value comprises: an SINR value and/or a BLER value.

9. The method according to claim 8, wherein sending the network coverage condition information to the eNB comprises:

sending, by the D2D UE, the network coverage condition information to the eNB according to an indication, issued by the eNB, of reporting the network coverage condition information, wherein the eNB issues the indication to the D2D UE through an SIB message, or RRC-specific signalling, or a Media Access Control (MAC) Control Element (CE) or Downlink Control Information (DCI) of a Physical Downlink Control Channel (PDCCH).

10. The method according to claim 1, further comprising: after detecting, by the D2D UE, the network coverage condition of the position of the D2D UE according to the network coverage determination parameter information, when the D2D UE determines that the position of the D2D UE is in an out-of-coverage area, receiving or sending, by the D2D UE, D2D information by virtue of a resource pool for out-of-coverage; and/or when the D2D UE determines that the position of the D2D UE is in an edge area of network coverage, receiving or sending, by the D2D UE, the D2D information by virtue of the resource pool for out-of-coverage.

11. The method according to claim 1, further comprising: if not receiving the network coverage determination parameter information sent by the eNB, determining, by the D2D UE after a Radio Link Failure (RLF) is detected through RLM measurement, that a current position of the D2D UE is in an out-of-coverage area, and sending and/or receiving D2D information by virtue of a D2D resource.

12. A non-transitory computer storage medium having stored therein computer programs configured to execute the method for detecting network coverage condition according to claim 1.

13. A method for detecting network coverage condition, comprising:

sending, by an Evolved Node B (eNB), network coverage determination parameter information to Device-to-Device (D2D) User Equipment (UE) located in a serving cell of the eNB for the D2D UE to detect a network coverage condition of a position of the D2D UE according to the network coverage determination parameter information;

wherein the network coverage determination parameter information comprises at least one of:

a Radio Resource Management (RRM) measurement threshold value, the RRM measurement threshold value comprising Reference Signal Received Power (RSRP) and/or Reference Signal Received Quality (RSRQ);

a Radio Link Monitoring (RLM) measurement threshold value, the RLM measurement threshold value being a Signal to Interference plus Noise Ratio (SINR) value or a Block Error Rate (BLER) value;

an RLM measurement parameter, the RLM measurement parameter comprising at least one of an N310 value, a T310 value or an N311 value; or indication information, the indication information representing that the network coverage determination parameter information is determination parameter information for out-of-coverage and/or determination parameter information for edge-of-coverage.

14. The method according to claim 13, wherein when the network coverage determination parameter information comprises a measurement threshold value, the network coverage determination parameter information further comprises: a determination time length,
wherein the determination time length is a time length within which a measurement value of the D2D UE is required to meet a determination condition indicated by the measurement threshold value.

15. The method according to claim 13, wherein sending, by the eNB, the network coverage determination parameter information to the D2D UE located in the serving cell of the eNB comprises at least one of:
when request information sent by the D2D UE is received, sending, by the eNB, the network coverage determination parameter information to the D2D UE located in the serving cell of the eNB, the request information being configured to request the eNB to send the network coverage determination parameter information;
when determining that the D2D UE is located on an edge of the serving cell, actively sending, by the eNB, the network coverage determination parameter information to the D2D UE; or
sending, by the eNB, the network coverage determination parameter information to all D2D UE in the serving cell.

16. The method according to claim 15, further comprising:
determining, by the eNB, the network coverage condition of the D2D UE according to (an) RRM or RLM measurement value(s), reported by the D2D UE, of (a) signal(s) of the serving cell and/or a neighbouring cell, and sending the indication information to the D2D UE for the D2D UE to determine the network coverage condition of a current position of the D2D UE according to the indication information sent by the eNB.

17. The method according to claim 16, further comprising:
issuing, by the eNB, an indication of reporting network coverage condition information to the D2D UE through a System Information Block (SIB) message, Radio Resource Control (RRC)-specific signalling, a Media Access Control (MAC) Control Element (CE) or Downlink Control Information (DCI) of a Physical Downlink Control Channel (PDCCH).

18. A non-transitory computer storage medium having stored therein computer programs configured to execute the method for detecting network coverage condition according to claim 13.

* * * * *